US011968926B2

United States Patent
Look et al.

(10) Patent No.: US 11,968,926 B2
(45) Date of Patent: Apr. 30, 2024

(54) CLAMP BEARING FOR FORAGE HARVESTER

(71) Applicant: CLAAS Selbstfahrende Erntemaschinen GmbH, Harsewinkel (DE)

(72) Inventors: Stefan Look, Warendorf (DE); Jochen Rathjens, Bielefeld (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 259 days.

(21) Appl. No.: 17/349,010

(22) Filed: Jun. 16, 2021

(65) Prior Publication Data

US 2021/0392806 A1    Dec. 23, 2021

(30) Foreign Application Priority Data

Jun. 17, 2020  (DE) .......................... 102020115944.7

(51) Int. Cl.
| | | |
|---|---|---|
| *A01D 41/14* | (2006.01) | |
| *A01D 41/06* | (2006.01) | |
| *A01D 43/08* | (2006.01) | |
| *F16C 23/08* | (2006.01) | |
| *F16C 35/06* | (2006.01) | |

(52) U.S. Cl.
CPC .......... *A01D 41/145* (2013.01); *A01D 41/06* (2013.01); *F16C 23/084* (2013.01); *A01D 43/08* (2013.01); *F16C 35/06* (2013.01); *F16C 2310/00* (2013.01)

(58) Field of Classification Search
CPC ...... A01D 43/08; A01D 41/145; A01D 69/12; A01D 41/06; F16C 23/084; F16C 35/06; F16C 35/067; F16C 2310/00
See application file for complete search history.

(56) References Cited

U.S. PATENT DOCUMENTS

| | | | | |
|---|---|---|---|---|
| 1,288,562 A | * | 12/1918 | Graf .......................... | F16C 9/06 384/216 |
| 2,230,782 A | * | 2/1941 | Maust ..................... | B03B 5/623 137/574 |
| 4,136,989 A | * | 1/1979 | Bianco .................. | F16C 35/063 384/585 |

(Continued)

FOREIGN PATENT DOCUMENTS

| | | | |
|---|---|---|---|
| CN | 100517892 C | * | 7/2009 |
| DE | 102018208791 A1 | | 12/2019 |

(Continued)

OTHER PUBLICATIONS

Enhlish translation of SU-985871-A1, Dec. 30, 1982.*

(Continued)

*Primary Examiner* — Thomas B Will
*Assistant Examiner* — Julia C Tran

(57) ABSTRACT

A forage harvester that includes a cutterhead assembly and two frame parts between which the cutterhead assembly is rotatably suspended. The forage harvester assembly is held on both frame parts by a clamp bearing that defines a rotary axis. Contact points between an element on the frame part side and an element on the assembly side of the clamp bearing lie on a spherical surface centered on the rotary axis.

14 Claims, 4 Drawing Sheets

(56) References Cited

U.S. PATENT DOCUMENTS

| | | | | |
|---|---|---|---|---|
| 4,856,406 A | * | 8/1989 | Ohmuro | G10D 13/04 |
| | | | | 84/419 |
| 5,357,862 A | * | 10/1994 | Kohara | B41F 13/20 |
| | | | | 101/352.04 |
| 6,450,866 B1 | | 9/2002 | Nieschulze | |
| 8,608,399 B2 | * | 12/2013 | Schumacher | A01D 34/33 |
| | | | | 403/135 |
| 10,012,261 B2 | * | 7/2018 | Jungeberg | F16C 11/0685 |
| 10,426,089 B2 | * | 10/2019 | Matousek | A01F 12/46 |
| 10,486,004 B1 | * | 11/2019 | Solis, Jr. | F16L 3/1075 |
| 2005/0185869 A1 | * | 8/2005 | Lenick | F16C 35/063 |
| | | | | 384/537 |
| 2005/0238271 A1 | | 10/2005 | Schafer et al. | |
| 2006/0185337 A1 | | 8/2006 | Engel et al. | |
| 2008/0264024 A1 | | 10/2008 | Baaken | |
| 2016/0150716 A1 | * | 6/2016 | De Coninck | A01D 41/16 |
| | | | | 56/153 |
| 2019/0124839 A1 | * | 5/2019 | Dorhout | A01D 45/02 |

FOREIGN PATENT DOCUMENTS

| | | |
|---|---|---|
| EP | 1034696 A1 | 9/2000 |
| EP | 1961288 A1 | 8/2008 |
| SU | 985871 A1 * | 12/1982 |

OTHER PUBLICATIONS

English translation of CN-100517892-C, Jul. 22, 2009.*
European Search Report issued in related application No. EP 21170342, dated Oct. 20, 2021 (7 pages).

* cited by examiner

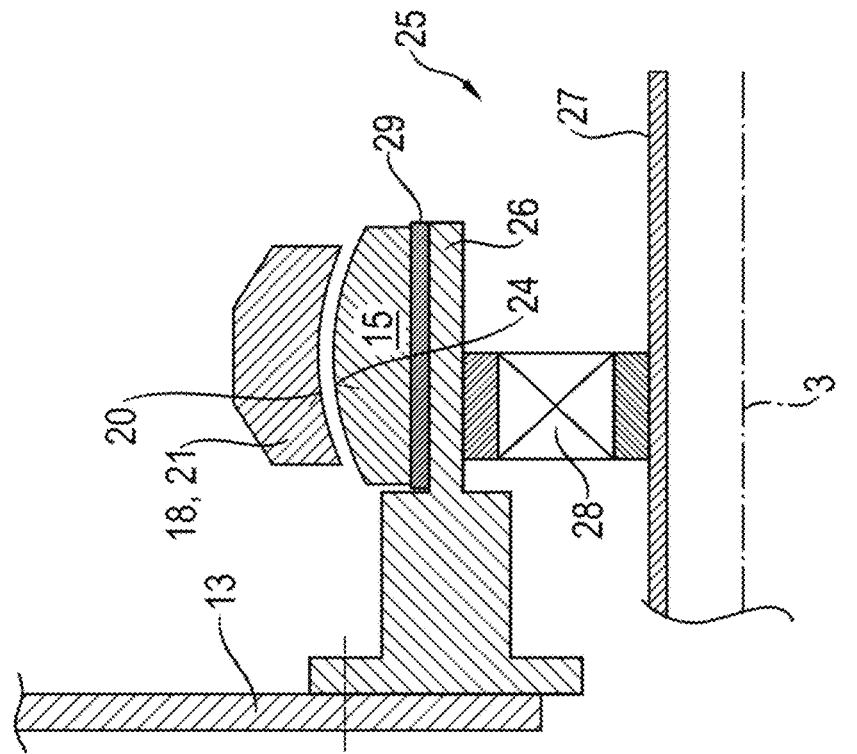
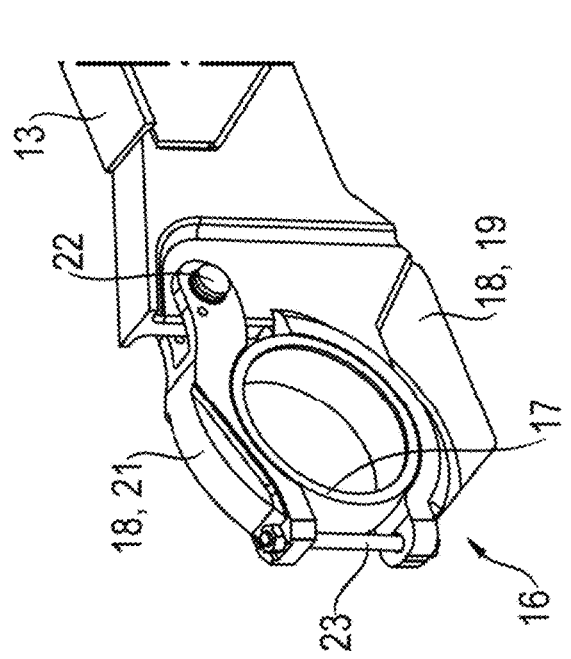
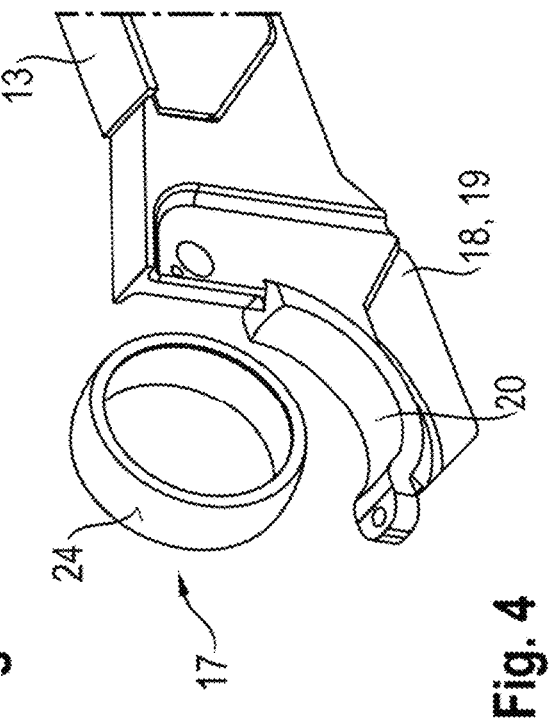

CLAMP BEARING FOR FORAGE HARVESTER

CROSS REFERENCE TO RELATED APPLICATION

This application claims priority under 35 U.S.C. § 119 to German Patent Application No. DE 102020115944.7 filed Jun. 17, 2020, the entire disclosure of which is hereby incorporated by reference herein.

TECHNICAL FIELD

The present invention relates to a forage harvester having a cutterhead assembly.

BACKGROUND

A forage harvester typically has a chassis with frame parts that extend in the longitudinal direction of the forage harvester and are connected to each other by beams running in a transverse direction, and on which a front axle, rear wheels, a motor, a cutting mechanism, etc., are mounted. The main component of the forage harvester is a cutterhead equipped with blades.

DESCRIPTION OF THE FIGURES

The present application is further described in the detailed description which follows, in reference to the noted drawings by way of non-limiting examples of exemplary implementation, in which like reference numerals represent similar parts throughout the several views of the drawings, and wherein:

FIG. 3 shows a closed clamp bearing;

FIG. 4 shows parts of the clamp bearing;

FIG. 5 shows an axial section of the clamp bearing; and

DETAILED DESCRIPTION

Figure 1:
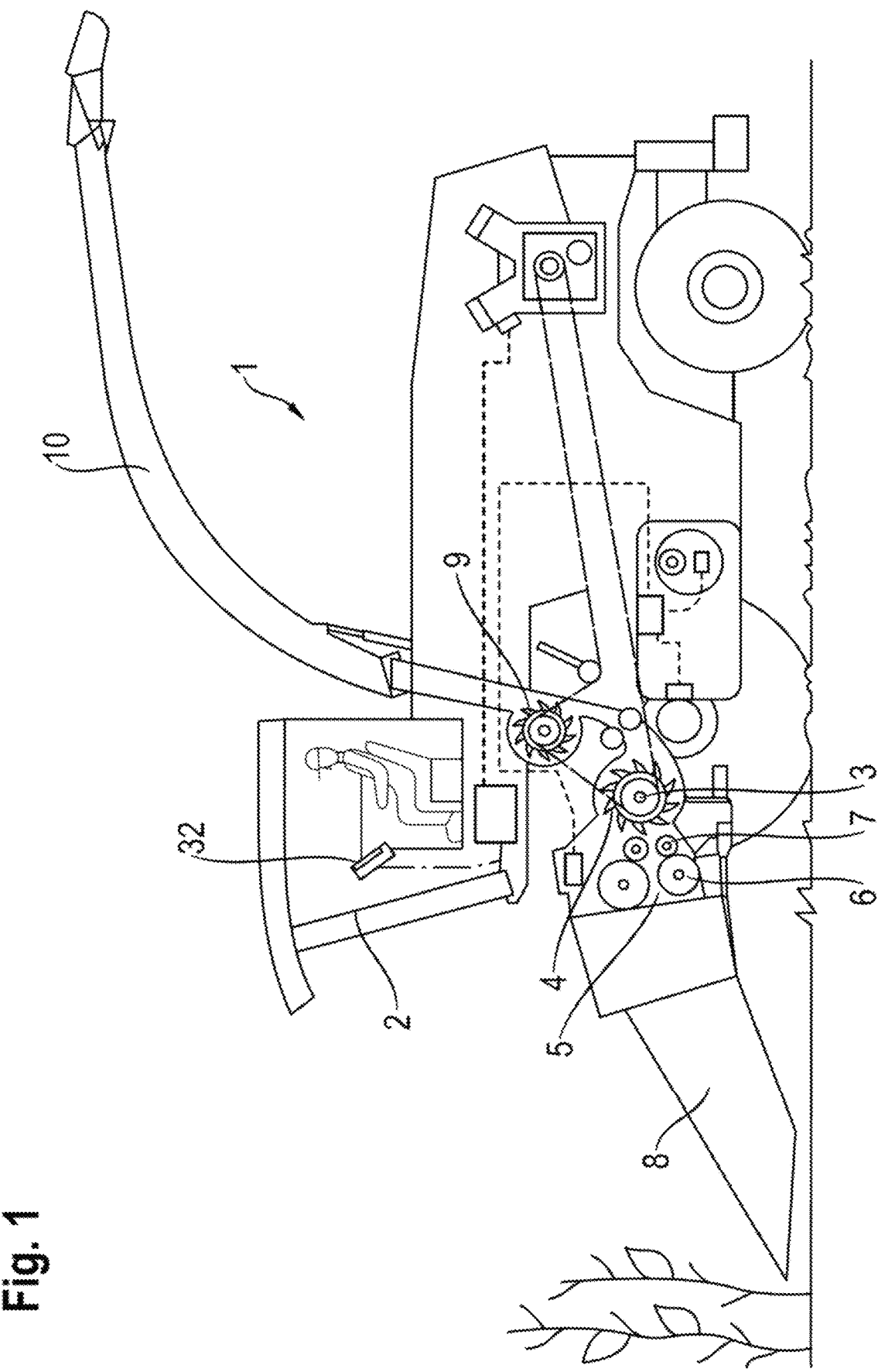
FIG. 1 shows a schematic representation of a forage harvester.

As discussed in the background, the flow of harvested material is conveyed toward the cutterhead while the cutterhead rotates so that the cutterhead has a large moment of inertia and accordingly a large diameter and great weight to rotate evenly despite changing resistance from the harvested material; this and the highly fluctuating cutting forces at the blades during operation render necessary a powerful shaft and an accordingly large, heavy duty bearing. When bearing play enables vibration movements by the cutterhead, this impairs the cutting quality; moreover, it may lead to increased bearing wear, which in turn increases the bearing play.

Thus, in one or some embodiments, a forage harvester is disclosed that enables a lower-wear bearing (such as a low-wear bearing) and precise guidance of the forage harvester movement over a long time.

In one or some embodiments, a forage harvester has a cutterhead assembly and two frame parts, between which the forage harvester assembly is rotatably suspended. The forage harvester assembly may be held on both frame parts by a clamping bearing that defines a rotary axis. In this way, lower-wear bearing may be achieved in that there are contact points between an element on the frame part side and an element on the assembly side of the clamp bearing on a spherical surface centered on the rotary axis. With this construction or configuration, each clamp bearing in and of itself does not fix the rotary axis; rather, each clamp bearing may only define a single point, such as the midpoint of the spherical surface, as a point through which the rotary axis runs. Accordingly, the cutterhead assembly may be mounted on the frame parts free of inner stress and can rotate relative thereto with lower friction and wear.

In one or some embodiments, to ensure ongoing secure clamping, one or both elements of the clamp bearing have spherical surfaces that contact each other over a large surface because they are shaped complementary with each other.

In one or some embodiments, the assembly-side element of the clamp bearing may comprise a ring through with a shaft of the cutterhead assembly extends, and the spherical surface is an exterior peripheral surface.

To allow the cutterhead assembly to be disassembled, the element on the frame part side may comprise at least two parts over which the spherical surface of the element on the frame part side is distributed. In particular, a bottommost of the two parts comprises a fixed component of one of the frame parts so that the cutterhead assembly may be stably supported even when the uppermost of the two parts is disconnected.

A clamping bolt may sufficiently draw the two parts together and clamping the assembly-side element. In this regard, the first part and the second part are fixed in relation via at least one clamping bolt. When the clamping bolt draws the parts together on one side of the shaft, an articulated connection may be provided between the parts on the opposite side.

In one or some embodiments, the cutterhead assembly comprises a shaft rotatably accommodated in the clamp bearings, and an adapter for a harvesting header that is connected to the shaft for concomitant rotation. Since the shaft rotates and the adapter rotates with it, the height above the floor of the harvesting header may be adapted.

The cutterhead, for its part, may be rotatably mounted on the shaft. Since the shaft accordingly only has to execute small, slow rotations, it may be slidingly mounted in the clamp bearing.

To drive the rotation of the shaft (and therefore the height adjustment of the adapter), a hydraulic actuator may be included and positioned between the frame parts and the cutterhead assembly. In this regard, in one embodiment, the hydraulic actuator is configured to drive a pivoting movement of the adapter about the rotary axis Referring to the figures, FIG. 1 shows a schematic representation of a forage harvester 1. The chassis of the forage harvester 1 is shown cut away in its front part below a driver's cab 2 in order to illustrate internal assemblies of the forage harvester that are processing harvested material. One of these assemblies is a cutterhead assembly with a cutterhead 4 that rotates about an axis 3 extending in the vehicle's transverse direction.

A conveying device 5 for conveying harvested material is upstream from the cutterhead assembly. The conveying device 5 may comprise a plurality of roller pairs 6, 7 that each border a gap and are rotatably driven in opposite directions in order to feed the harvested material running through the gap to the cutterhead 4.

The conveying device 5 may, in turn, bear or include a harvesting header 8 that may be exchanged for another to adapt to the plant material to be collected.

Harvested material comminuted in the cutterhead assembly is fed to a postaccelerator 9 that lends the comminuted harvested material the necessary speed to run through a discharge chute 10 and be transferred into an accompanying vehicle (not shown).

Figure 2:
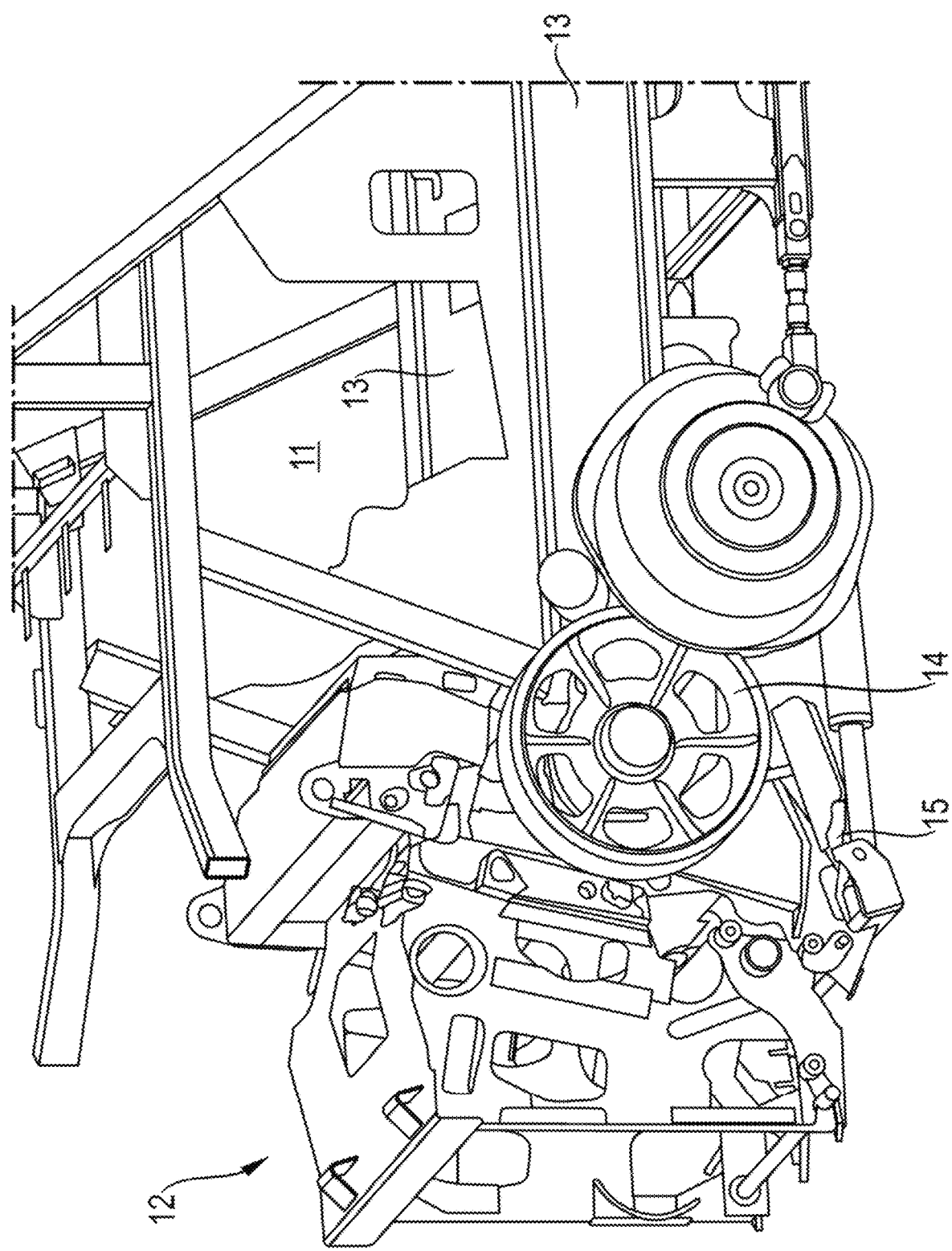
FIG. 2 shows a view of a frame of the forage harvester and a cutterhead assembly mounted in the frame.

FIGS. 2 and 3 show the front part of a frame 11 of the forage harvester 1 and the cutterhead assembly 12 mounted therein in a perspective view obliquely from the front. The frame 11 comprises two frame parts 13 extending substantially horizontally in the longitudinal direction of the vehicle, for example in the form of T or double-T profiles that are rigidly connected to each other by crossbeams (not visible in the figure), and on which a front axle as well as steerable rear wheels of the forage harvester 1 may be suspended.

In FIG. 2, the front end of the frame parts 13 is hidden behind a pulley 14 driving the rotation of the cutterhead, or a housing 15 surrounding the cutterhead.

FIG. 3 shows this front end in a detailed view. The frame part 13 terminates in a clamp bearing 16 that is provided to accommodate a shaft of the cutterhead assembly 12. Only one annular element 17 of the cutterhead assembly 12 is shown and is provided to accommodate a shaft that, as described in greater detail below, connects the pulley 14 to the housing 15 and the cutterhead 4.

An element 18 on the frame part side of the clamp bearing 16 comprises a part 19 securely connected to the frame part 13 in the form of a ring sector whose concavity 20 (see also FIG. 4) faces upward so that the cutterhead assembly 12 may be stably mounted while being installed in or removed from the forage harvester 1 while the annular element 17 is being inserted into the concavity 20. In this regard, in one embodiment, part 19 is non-movable when inserting the at least a part of the cutterhead assembly into the concavity. Thus, in one embodiment, different parts of the clamp bearing 16 may be separate from but connected to other parts, such as part 19 securely connected to the frame part 13. Alternatively, different parts of the clamp bearing 16 may be integrated with other parts, such as part 19 being integrated with a forms part of the frame part 13. Either instance (whether connected to or integrated with) may be considered associated with or on a side of the respective part (e.g., part 19 whether integrated with or connected to the frame part 13 is on a side of the frame part).

A second ring-sector-shaped part 21 of the element 18 on the frame part side is connected to the frame part 13 by a joint 22. The front tips of the parts 19, 21 (which in one embodiment comprise two separate parts) each have a hole in which a clamping bolt 23 can be installed. To be able to insert the cutterhead assembly 12 into the concavity 20 or remove it therefrom, the clamping bolt 23 is removed, and the part 21 is folded up or collapsed.

As can be seen in FIG. 4, the concavity 20 is part of a spherical surface (e.g., at least partly spherical) just like the exterior peripheral surface 24 of the annular element 17. The annular element 17 may therefore be pivoted about two axes that are orthogonal to the shaft when the annular element 17 is inserted into the concavity 20. When the cutterhead assembly 12 is inserted into the two parts 19, the orientation of their axis may freely adapt to any tolerances in positioning and orientation of the parts 19 so that, when the clamping bolt 23 is tightened and the annular element 17 is clamped between the parts 19, 21, no internal tension arises therefrom in the cutterhead assembly 12.

In one or some embodiments, the spherical surfaces of the concavity 20 and the exterior peripheral surface 24 each have the same radii; moreover, the part 21 may have a concavity with the same radius so that the parts 19, 21 lie substantially or entirely against the exterior peripheral surface 24 when in a tightened state.

FIG. 5 shows an axial section of one of the clamp bearings 16 and the shaft 25 of the cutterhead assembly 12 accommodated therein. The midpoint of the spherical surfaces of the concavity 20 and the exterior peripheral surface 24 lie on the axis 3 of the shaft 25. The shaft 25 comprises a hollow shaft 26 and an inner shaft 27 that runs concentrically its interior. The inner shaft 27 bears the pulley 14 on one side of the clamp bearing 16 and the cutterhead 4 on the other side. The hollow shaft 26 bears the housing 15. A roller bearing 28 between the hollow shaft 26 and the inner shaft 27 ensures that the hollow shaft 26 and the inner shaft 27 are rotatable relative to each other so that the pulley 14 may drive the rotation of the cutterhead 4 while the housing 15 remains at rest. A plain bearing 29 (e.g., a sliding bearing or a slide bearing) between the hollow shaft 26 and the annular element 17, in one embodiment a lubricant between the exterior surface of the hollow shaft 26 and the inner surface of the annular element 17, allows the hollow shaft 26 and the housing 15 to rotate about the axis 3 independent of the rotation of the cutterhead 4.

Figure 6:
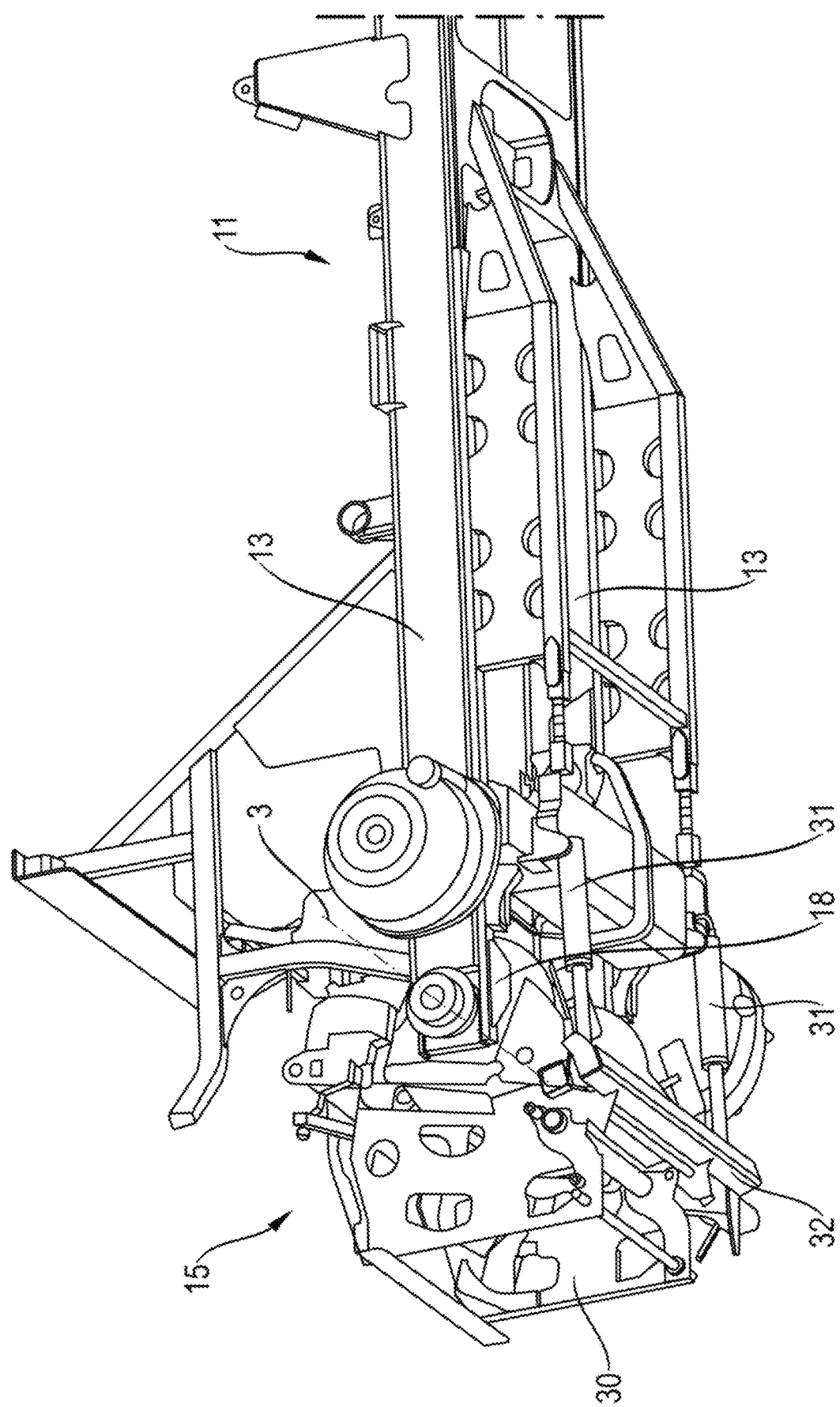
FIG. 6 shows a view of the frame and a housing of the cutterhead assembly obliquely from below.

FIG. 6 shows a view of the frame of the forage harvester 1 and the housing 15 of the cutterhead assembly 12 obliquely from below. A rectangular adapter 30 on the front side of the housing 15 is provided for mounting the harvesting header 8 (not shown in this figure) thereupon, or for coupling a lifting machine thereto for assisting with the installation and removal of the cutterhead assembled 12 in/from the forage harvester 1. A hydraulic actuator 31 extends in the longitudinal direction of the vehicle below each of the frame parts 13. A rear end of each actuator 31 is connected to the frame, and the front ends engage jointly with a crossbeam 32 of the housing. As the actuators 31 extend together, they pivot the housing 15 about the axis 3 and thereby lift, if applicable, the harvesting header 8 mounted on the adapter 30. As a consequence of the pivotability of the annular elements 17 in the elements 18 on the frame part side, their inner sides are oriented precisely flush with each other so that the hollow shaft 26 may rotate therein without experiencing flexural load. This ensures slight, low-wear rotation not just on the plain bearing 29, but also on the roller bearing 28.

Further, it is intended that the foregoing detailed description be understood as an illustration of selected forms that the invention can take and not as a definition of the invention. It is only the following claims, including all equivalents, that are intended to define the scope of the claimed invention. Further, it should be noted that any aspect of any of the preferred embodiments described herein may be used alone or in combination with one another.

LIST OF REFERENCE NUMBERS

1 Forage harvester
2 Driver's cab
3 Axis
4 Cutterhead
5 Conveyor
6 Roller pair
7 Roller pair
8 Harvesting header
9 Postaccelerator 10 Discharge chute
11 Frame
12 Cutterhead assembly
13 Frame part
14 Pulley
15 Housing
16 Clamp bearing
17 (Annular) element
18 (Frame part-side) element
19 Part of 18
20 Concavity
21 Part of 18
22 Joint
23 Clamping bolt
24 Exterior peripheral surface
25 Shaft
26 Hollow shaft
27 Inner shaft
28 Roller bearing
29 Plain bearing
30 Adapter
31 Actuator
32 Crossbeam

The invention claimed is:

1. A forage harvester comprising:
a cutterhead assembly;
two frame parts between which the cutterhead assembly is rotatably suspended; and
at least one clamp bearing that is configured to hold the cutterhead assembly on both of the two frame parts, the at least one clamp bearing defining a rotary axis and comprises an element on a side of at least one of the two frame parts and an element on a side of the cutterhead assembly;
wherein one or more contact points lie between the element on the side of at least one of two frame parts and the element on the side of the cutterhead assembly on a spherical surface centered on the rotary axis;
wherein the element on the side of at least one of the two frame parts comprises at least two parts; and
wherein the spherical surface is distributed over the at least two parts, with at least one clamping bolt configured to draw together the at least two parts;
wherein the at least two parts each having an at least partly spherical surface;
wherein the at least two parts comprises a first part and a second part, the first part being movable in order to insert at least a part of the cutterhead assembly into a concavity formed by both of the at least two parts;
wherein the second part is non-movable when inserting the at least a part of the cutterhead assembly into the concavity;
wherein the first part is configured to be folded up or collapsed when inserting the at least a part of the cutterhead assembly into the concavity;
wherein the first part is connected on one side to at least one of the two frame parts; and
wherein the second part is connected on one side to the at least one of the two frame parts at a different place than the first part so that the first part and the second part on the one side do not touch one another.

2. The forage harvester of claim 1, wherein the contact points lie on spherical surfaces of the element on the side of at least one of two frame parts and the element on the side of the cutterhead assembly which are complementary with each other.

3. The forage harvester of claim 1, wherein the element on the side of the cutterhead assembly comprises an annular element.

4. The forage harvester of claim 3, wherein the annular element comprises a ring through with a shaft of the cutterhead assembly extends, the shaft connecting a pulley driving rotation of at least a part of the cutterhead assembly; and
wherein the spherical surface is an exterior peripheral surface of the ring.

5. The forage harvester of claim 1, wherein the at least one clamp bearing defines a midpoint of the spherical surface as a point through which the rotary axis runs.

6. The forage harvester of claim 1, wherein the element on the side of at least one of two frame parts and the element on the side of the cutterhead assembly have complementary shapes with each other.

7. The forage harvester of claim 6, wherein an exterior surface of the element on the side of the cutterhead assembly is at least partly spherical; and
wherein an interior surface of the element on the side of at least one of two frame parts is at least partly spherical.

8. The forage harvester of claim 1, wherein the cutterhead assembly comprises a shaft rotatably accommodated in the at least one clamp bearing, and an adapter for a harvesting header that is configured to connect to the shaft for concomitant rotation.

9. The forage harvester of claim 8, wherein the cutterhead assembly comprises a cutterhead that is rotatably mounted on the shaft; and
further comprising at least one hydraulic actuator configured to drive a pivoting movement of the adapter about the rotary axis.

10. The forage harvester of claim 1, wherein the element on the side of the cutterhead assembly is configured to pivot about two axes that are orthogonal to a shaft of the cutterhead assembly when the element on the side of the cutterhead assembly is inserted into the spherical surface.

11. The forage harvester of claim 10, wherein the element on the side of the cutterhead assembly includes an inner side that is oriented so that a hollow shaft rotates therein without experiencing flexural load.

12. The forage harvester of claim 1, wherein the first part is connected to at least one of the two frame parts by a joint so that the first part is configured to be folded up or collapsed when inserting the at least a part of the cutterhead assembly into the concavity.

13. The forage harvester of claim 1, wherein the at least one clamping bolt includes a rod; and
wherein each of the at least two parts has a hole in which the at least one clamping bolt is installed so that the rod separates the hole for each of the at least two parts.

14. A forage harvester comprising:
a cutterhead assembly;
two frame parts between which the cutterhead assembly is rotatably suspended; and
at least one clamp bearing that is configured to hold the cutterhead assembly on both of the two frame parts, the at least one clamp bearing defining a rotary axis and comprises an element on a side of at least one of the two frame parts and an element on a side of the cutterhead assembly;
wherein one or more contact points lie between the element on the side of at least one of two frame parts and the element on the side of the cutterhead assembly on a spherical surface centered on the rotary axis;

wherein the element on the side of at least one of the two frame parts comprises at least two parts;

wherein the spherical surface is distributed over the at least two parts, with at least one clamping bolt configured to draw together the at least two parts;

wherein the at least two parts each having an at least partly spherical surface;

wherein the at least two parts comprises a first part and a second part, the first part being movable in order to insert at least a part of the cutterhead assembly into a concavity formed by both of the at least two parts;

wherein the second part is non-movable when inserting the at least a part of the cutterhead assembly into the concavity;

wherein the first part is configured to be folded up or collapsed when inserting the at least a part of the cutterhead assembly into the concavity; and wherein, when the cutterhead assembly is inserted into the at least two parts, orientation of an axis of the cutterhead assembly adapts to tolerances in positioning and orientation of the at least two parts so that, when the at least one clamping bolt is tightened and the element on the side of the cutterhead assembly is clamped between the at least two parts, no internal tension arises therefrom in the cutterhead assembly.

* * * * *